(12) United States Patent
Tame

(10) Patent No.: US 6,619,741 B1
(45) Date of Patent: Sep. 16, 2003

(54) EASY ENTRY MID-POSITION MEMORY SEAT

(75) Inventor: Omar D. Tame, West Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/830,783

(22) PCT Filed: Nov. 5, 1999

(86) PCT No.: PCT/CA99/01047

§ 371 (c)(1),
(2), (4) Date: May 1, 2001

(87) PCT Pub. No.: WO00/27668

PCT Pub. Date: May 18, 2000

Related U.S. Application Data

(60) Provisional application No. 60/107,163, filed on Nov. 5, 1998.

(51) Int. Cl.[7] .................................................. B60N 2/00
(52) U.S. Cl. ....................................................... 297/341
(58) Field of Search .............................. 297/344.1, 344, 297/378.12, 378.1; 248/429, 424

(56) References Cited

U.S. PATENT DOCUMENTS

| | | | |
|---|---|---|---|
| 4,497,518 A | | 2/1985 | Nishimura et al. |
| 4,671,571 A | | 6/1987 | Gionet |
| 4,881,774 A | * | 11/1989 | Bradley et al. |
| 4,909,570 A | | 3/1990 | Matsuhashi |
| 5,407,165 A | | 4/1995 | Balocke |
| 5,531,503 A | * | 7/1996 | Hughes |
| 5,605,377 A | | 2/1997 | Tame |
| 5,626,392 A | | 5/1997 | Bauer et al. |
| 5,688,026 A | | 11/1997 | Reubeuze et al. |
| 5,820,216 A | | 10/1998 | Feuillet |
| 5,873,629 A | * | 2/1999 | Schuler |
| 5,899,532 A | * | 5/1999 | Paisley et al. |
| 6,036,267 A | * | 3/2000 | Downey et al. |
| 6,098,946 A | * | 8/2000 | Sechet et al. |
| 6,254,188 B1 | * | 7/2001 | Downey |

FOREIGN PATENT DOCUMENTS

| | | |
|---|---|---|
| FR | 2 691 681 A1 | 5/1992 |
| GB | 2 255 903 A | 11/1992 |
| GB | 2 303 299 A | 2/1997 |
| WO | PCT/GB95/00091 | 1/1995 |

* cited by examiner

Primary Examiner—Milton Nelson, Jr.
(74) Attorney, Agent, or Firm—Clark Hill PLC

(57) ABSTRACT

An automotive seat assembly (10) has a seat cushion and a seat back pivotally mounted to the seat cushion. The seat assembly includes a seat track mechanism having a lower track member (18) and an upper track member (20) supported by the lower track member (18) for movement between forward and rearward positions. An incremental locking mechanism is mounted between the upper and lower track members (18) for locking the track members in a desired position and for unlocking the track members to allow the upper track member (20) to move between the forward and rearward positions. A slide actuator is disposed adjacent the 30 locking mechanism and is moveable to an engaged position for disengaging the locking mechanism 46 and moving the upper track member (20) to a forward dump position. The seat assembly (10) also includes a positioning device which comprises a locator mounted to the upper track member (20) and moveable with the upper track member (20) as the upper track member (20) is moved to the forward dump position. The locator is interconnected to the slide actuator wherein the locator moves between a release position allowing the upper track member (20) to freely move relative to the lower track member (18) and a blocking position to align with a fixed stop which limits the movement of the upper track member (20) to a predetermined stop position upon rearward movement of the upper track member (20) from the forward dump position.

22 Claims, 3 Drawing Sheets

EASY ENTRY MID-POSITION MEMORY SEAT

This application claims benefit of Provisional application No. 60/107,163 filed Nov. 5, 1998.

FIELD OF THE INVENTION

The subject invention relates to an automotive seat assembly having a seat track mechanism with a fixed positioning device for positioning the seat assembly as the seat is returned from a forward dumped position.

DESCRIPTION OF THE PRIOR ART

Automobiles and other vehicles are equipped with various seat assemblies that arm each adjustable to many intermediate locations between forward and rearward positions. Sliding a seat forward or rearward to a particular location is desirable for enhancing an occupant's comfort. In most two-door vehicles the front seats arc also capable of automatically moving to a single forward dumped position by simply actuating a lever and pushing a seat back forward This forward movement of the seat assembly permits easier access into a sear seating or rear cargo area.

These forward and rearward movements of the seat may be accomplished by a dual seat track mechanism or a single seat track mechanism. The single seat track mechanisms typically include an upper seat track member movably supported on a lower seat track member. The upper seat track member is mounted to the seat cushion of the seat assembly and the lower seat trace member is mounted to the floor of the vehicle. There is also typically a locking mechanism for securing the upper seat track member to the lower seat track member.

There is also typically a slide actuator for releasing the locking mechanism and propelling the upper seat track member to the forward dumped position The slide actuator is activated by actuating the lever and pushing a seat back of the seat assembly forward. A pretensioned spring urges the seat forward to the forward dumped position, thereby allowing easier access into the rear seating or storage area. The seat bottom, seat back, and all other seating accessories move forward together to the forward dumped position. When access to the rear seating or storage area is no longer desired, the user simply pushes the seat back rearward which re-engages the locking mechanism with the lower seat track member.

As the seat by is being returned to its original seating position, it is desirable to have some type of positioning feature that allows the seat assembly to return to a position which allows access for the front passenger without the seat moving to the rearward most position.

One such positioning feature is disclosed in British Patent No. 2 255 903. The '903 patent include& a walk in mechanism mounted to an upper track and interconnected to a seat back of the seat assembly. The walk in mechanism includes a lever and a trigger for releasing the seat tracks when the seat assembly moves to a forward dumped position and for automatically re-securing the seat tacks at a predetermined position when the seat assembly is returned from the forward dumped position. The '903 patent requires that the , seat back be folded over a seat cushion in order to release the seat tracks and that the seat back be returned to an operative position, i.e., upright, when returning the seat assembly from the forward dumped position. During the returning movement of the seat assembly, the trigger interferes with a fixed stop which moves the lever such that the lever can allow the seat tracks to re-secure the seat assembly at the predetermined location. If the seat back is not in the operative position during this return movement, the lever prevents the seat tracks from resecuring the seat assembly. Hence, if the seat assembly is returned from the forward dumped position with the seat back overlaying the seat cushion, as is commonly done, the seat track locking mechanism is capable of locking the seal assembly in an undesirable position aft of the fixed stop. This obviously defeats the entire purpose of the mechanism as disclosed in the '903 patent. Accordingly, it would be desirable to develop a mechanism that cannot be easily defeated or overridden. The prior art has also contemplated a "memory" feature such that the original incremental adjustment position is retained. The prior art memory devices are typically separate slides which independently mount to the seat track mechanisms. The sliders are then periodically moved by the locking mechanism to maintain the desired memory position. Examples of these prior art memory devices are disclosed in U.S. Pat. Nos. 4,881,774 , 4,952,846, and 5,100,092, and British Patent No. 2 303 299. These prior art devices, however, are of a relatively complicated design with a number of moving pars which add to the cost, weight and complexity of the seat assembly. In addition, these prior art devices can malfunction which reduces the effectiveness of the memory feature. Finally, the prior art memory devices limit the overall range of forward and rearward movement of the seat assembly.

SUMMARY OF THE INVENTION

The disadvantages of the prior art may be overcome by providing a seat assembly having a seat track mechanism which incorporates a seat dumping feature and a positioning feature of a relatively simple construction to reduce the cost and weight of the design. The positioning feature should locate the seat in a predetermined position when the seat is returned from the forward dumped position. In addition, the positioning device should be designed so as to not be prone to failure and not limit the overall adjustment capability of the seat track mechanism.

According to one aspect of the invention, there is provided an automotive seat assembly having a seat cushion and a seat back mounted to the seat cushion. The seat assembly includes a seat track mechanism having a lower track member and an upper track member mounted to the seat cushion and movably supported by the lower track member for movement between forward and rearward positions. An incremental locking mechanism is mounted between the upper and lower track members for selectively locking the track members in a desired position and for selectively unlocking the track members to allow the upper track member to move between the forward rearward positions. A slide actuator is disposed adjacent the locking mechanism and is selectively moveable to an enraged position for disengaging the locking mechanism and slidably moving tho upper track member to a forward dump position. The assembly is characterized by a locator mounted to the upper track member and moveable with the upper track member as the upper track member is moved to the forward dump position. The locator is interconnected to the slide actuator wherein the locator moves between a release position allowing the upper track member to freely move relative to the lower track member and a blocking position to limit movement of the upper track member to a predetermined stop position upon rearward movement of the upper track member from the forward dump position. Accordingly, the subject invention provides a positioned device of a relatively simple design and of minimal weight and cost to the seat assembly. The positioning device does not interfere and remains dormant during the normal forward and rearward incremental movement of the seat track mechanism. This creates a positioning device which does not limit the overall movement of the seat track mechanism. In addition, due to the low number of moving parts and ease of operation, the subject invention is not prone to failure.

BRIEF DESCRIPTION OF THE DRAWINGS

Other advantages of the present invention will be readily appreciated as the same becomes better understood by reference to the following detailed description when consider connection with the accompanying drawings wherein.

DETAILED DESCRIPTION OF THE PREFERRED EMBODIMENT

Figure 1:
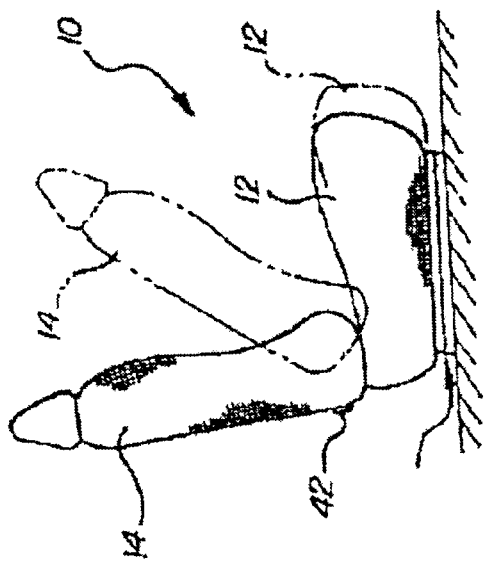
FIG. 1 is a side elevation view of an automotive seat assembly.

Referring to the Figures, wherein like numerals indicate like or corresponding parts throughout the several views, an automotive seat assembly is generally shown at 10 in FIG. 1.

The seat assembly 10 comprises a seat cushion 12 and a seat back 14 mounted to the seat cushion 12. Preferably, the saw back 14 is pivotally mounted to the seat cushion 12 by a suitable recliner as is known in the at, including the recliner described in Canadian parent application no. 2,243, 166. As is also known in the art, the seat back 14 and seat cushion 12 each include corresponding frames covered by foam pads and a suitable trim cover material such as cloth, vinyl and/or leather.

Referring also to FIGS. 2 through 5, the seat assembly 10 includes a seat track mechanism, generally shown at 16, for providing fore and aft adjustment for the seat assembly 10. The seat track mechanism 16 includes a lower track member 18 and an upper track member 20 movably supported by the lower track member 1S. The upper 20 and lower 18 track members may be of any suitable design as is known in the seat track all. As also known in the seat track art, the seat track mechanism 16 includes two sets of upper 20 and lower 18 track members with one sot mounted to each side of the seat assembly 10. For illustrative purposes, only one set of upper 20 and lower 18 track members are shown and discussed in greater detail.

The seat track mechanism 16 provides for incremental fore and aft adjustment of the seat assembly 10. Specifically, the lower track member 18 is mounted via a riser assembly to a floor 22 of a vehicle (not shown) and the upper track member 20 is mounted to the seat cushion 12 for moving the seat assembly 10 between forward and rearward positions. An incremental locking mechanism 24 is mounted between the upper 20 and lower 18 track members for selectively locking the track member 18, 20 in a desired seating position. This in turn locks the seat assembly 10 to the floor 22 of the vehicle. The locking mechanism 24 can also unlock the track members 18, 20 to allow the upper track member 20 to move between the forward and rearward positions. As appreciated, there are a number of additional features and components which are included in the seat track mechanism 16 to facilitate the smooth operation thereof. The seat track assembly, including these additional components are described in detail in U.S. Pat. No. 5,741,000.

Figure 5:
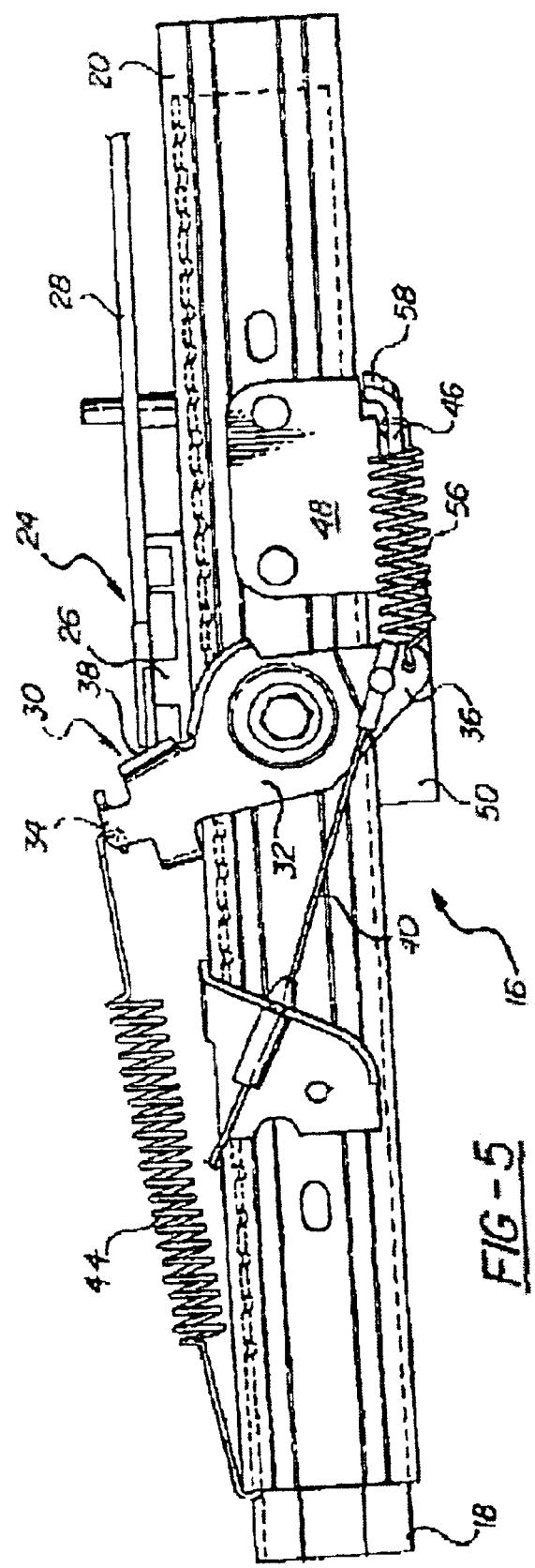
FIG. 5 is a top view of the seat track mechanism of the seat assembly of FIG. 1.
Figure 2:
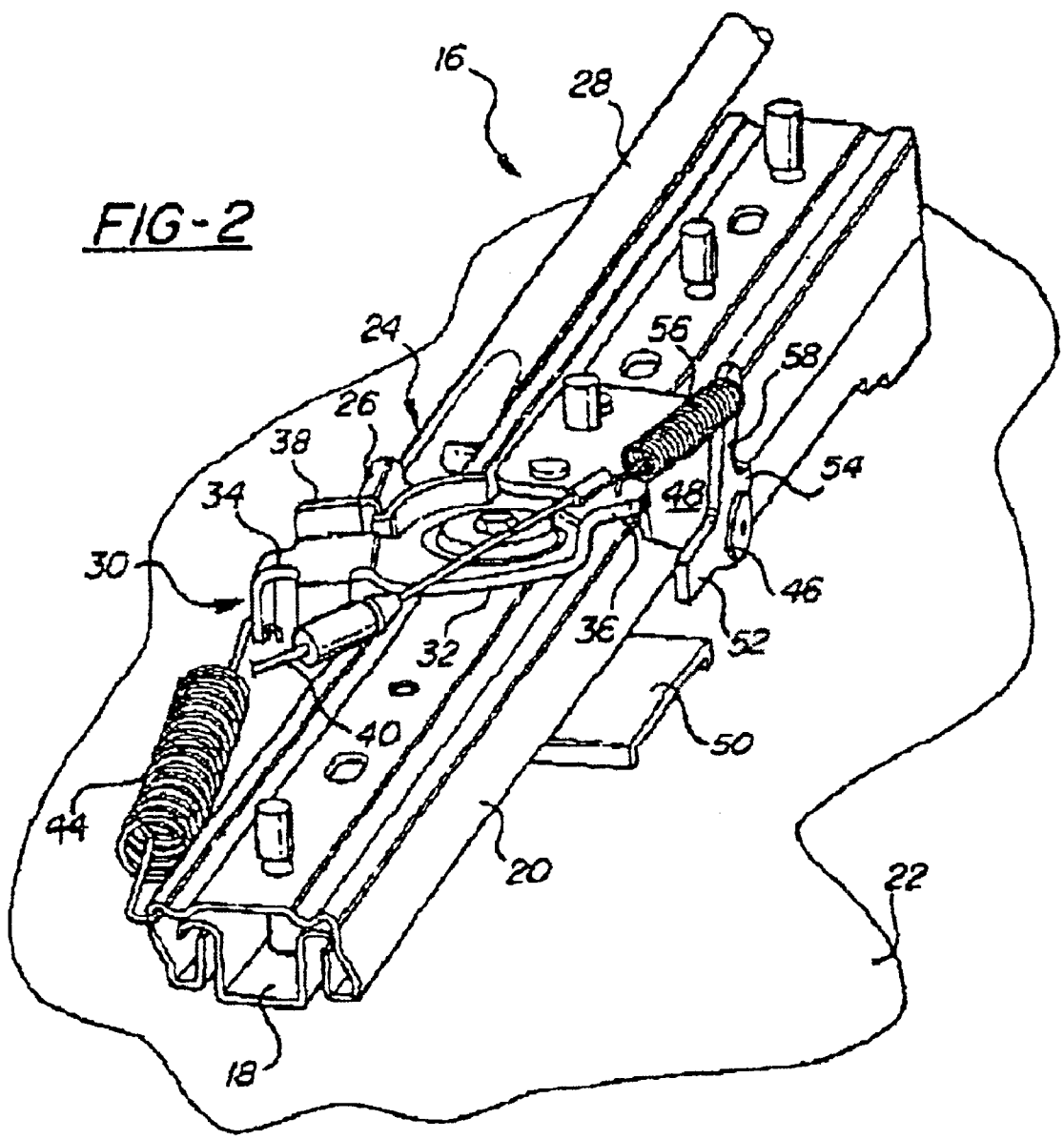
FIG. 2 is a perspective view of a seat track mechanism of the seat assembly of FIG. 1.

As best shown in FIGS. 2 and 5, the locking mechanism 24 preferably includes a locking plate 26 for selectively interlocking the upper 20 and lower 19 track members in the desired position. The locking mechanism 24 also includes an adjustment bar 28 connected to the locking plate 26 to move the locking plate 26 into a disengaged position to release the upper track member 20 from the lower track member 18 and allow the upper track member 20 to freely move relative to the lower tack member 18. This type of locking mechanism 24 is described in U.S. Pat. No. 5,741,000. As appreciated, the locking mechanism 24 may be of any suitable design or configuration without deviating from the overall scope of the subject invention.

The recliner of seat assembly 10 includes a "dumping" feature. As discussed in the background section, seat dumping features are common on seat assemblies utilized in two-door passenger vehicles. The dumping feature is activated when it is desirable to gain access to a rear of the vehicle. Specifically, the seat back 14 is tipped forward and then the front passenger seat slides to a forward dumped position away from the rear seats as shown in phantom in FIG. 1.

The slide forward feature is activated by a slide actuator 30 disposed adjacent the locking mechanism 24. Specifically, the slide actuator 30 is selectively moveable to an engaged position for disengaging the locking mechanism 24 and slidably moving the upper track member 20 to the forward dump position. As appreciated, a connecting cable (not shown) interconnects the slide actuators 30 on both sets of track members 18, 20 such that each of the upper track members 20 are simultaneously released from the corresponding lower track members 18.

The slide actuator 30 preferably includes a cam 32 rotatably mounted to a top surface of the upper track member 20. The cam 32 has diametrically opposed first 34 and second 36 ends with the first end 34 selectively engaging, the looking mechanism 24. Specifically, the first end 34 of the cam 32 includes a camming surface 38 for moving the locking mechanism 24 from an engaged or locked position to a disengaged or unlocked position to unlock the track members 18, 20 enabling sliding relative movement therebetween.

A control cable 40 is suitably mounted to the upper track member 20 and connected to the second end 36 of the cam 32 to provide the rotation of the cam 32 toward the engaged position. The control cable 40 Is In turn connected to the seat back 14 at connection 42 as shown in FIG. 1. As appreciated, the connection 42 can be mounted anywhere along the seat back 14, such as at the juncture of the seat cushion 12 and seat back 14, along the side of the seat back 14, or at the top of the seat back 14.

A cam return spring 44 is connected to the first end 34 of the cam 32 to continuously bias the cam 32 towards the disengaged position spaced from the locking mechanism 24. With the cam 32 in the disengaged position, the upper track member 20, along with the remaining portions of the seat assembly 10, may be adjusted along the lower track member 18 in a usual manner.

The seat assembly 10 is provided with a locator 46 mounted to the upper track member 20 and moveable with the upper track member 20 as the upper track member 20 is moved to the forward dump position.

Figure 3:
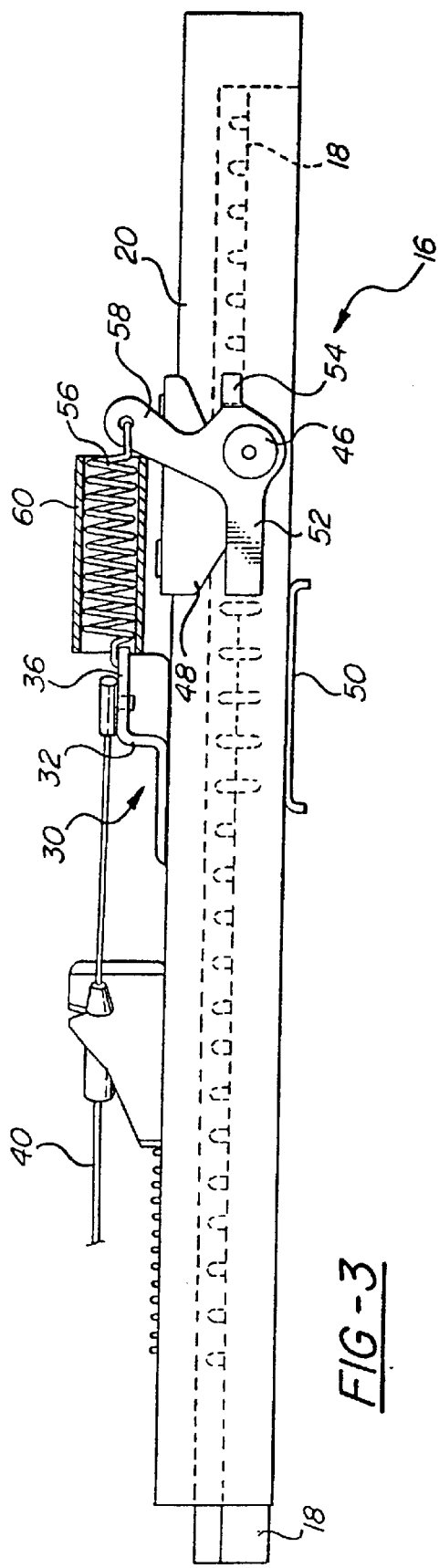
FIG. 3 is a side view of the seat track mechanism of the seat assembly of FIG. 1 with a locator in a release position.
Figure 4:
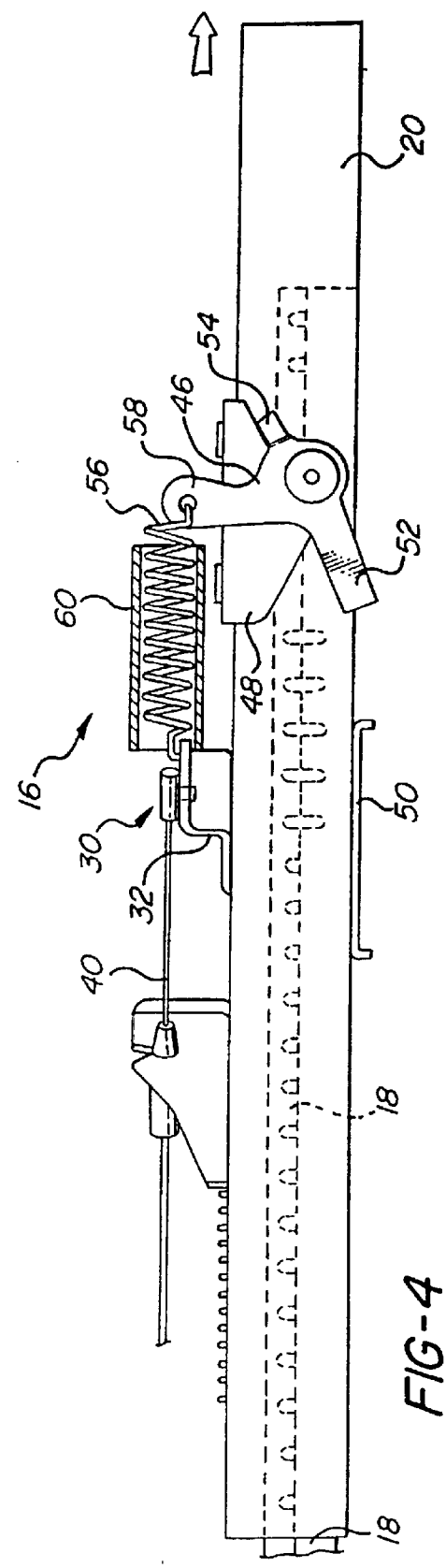
FIG. 4 is a side view of the seat track mechanism of the seat assembly of FIG. 1 with the locator in a blocking position.

As illustrated best in FIGS. 2 through 4, the locator 46 is pivotally mounted to the upper track member 20 and includes an outwardly extending first arm 52 selectively aligned with a fixed stop 50 to limit the rearward movement of the upper track member 20 to the predetermined stop position from the forward dump position. The locator 46 further includes a tab 54 engaging the mounting bracket 48 when the locator 46 is moved into the blocking position to limit the pivotal movement of the locator 46 and to accurately align the first arm 52 of the locator 46 with the fixed stop 50. A locator spring 56 interconnects the locator 46 and the slide actuator 30. Specifically, the second end 36 of the cam 32 is connected to the locator spring 56 such that rotation of the cam 32 moves the second end 36 and actuates the locator 46. The locator 46 further includes an outwardly extending second arm 58 connected to a push-pull connector.

The locator 46 is interconnected to the slide actuator 30 wherein the locator 46 moves between a release position allowing the upper track member 20 to freely move relative to the lower track member 18 and a blocking position to limit movement of the upper track member 20 to a predetermined stop position upon rearward movement of the upper track member 20 from the forward dump position. Preferably the locator 46 includes a mounting bracket 48 for securing the locator 46 to the upper track member 20.

The fixed stop 50 is aligned with the locator 46 when the locator 46 is in the blocking position to position the upper track member 20 in the predetermined stop position. Preferably the fixed stop 50 is positioned midway between the seat track mechanism 16 to position the seat assembly 10 in a mid position between the forward most and rearward most adjustment positions. As appreciated, the fixed stop 50 may be located anywhere along the adjustment length of the seat track mechanism 16. Preferably, the fixed stop 50 extends outwardly from the lower track member 18 to align with the locator 46. The fixed stop 50 may, however, be a part of the floor 22 of the vehicle, a part of the side pillar of the vehicle or extend from any other like part or surface without deviating from the scope of the subject invention.

As illustrated in FIGS. 3 and 4, the push-pull connector comprises a sleeve 60, or encapsulating tube, disposed about the locator spring 56 to continuously bias the locator 46 toward the release position when the slide actuator 30 is in a disengaged position. The sleeve 60 reduces any undesirable deformation of the locator spring 56 as the locator spring 56 pushes toward the locator 46. In other words the locator spring 56 acts as a push-pull tape cable. In particular, as viewed from the perspective of FIGS. 3 and 4, as the cam 32 is rotated to the engaged position, the locator spring 56 pulls on the second arm 58 of the locator 46 to rotate the locator 46 counter clockwise until the tab 54 abuts the mounting bracket 48 (FIG. 4). As the cam 32 returns to the disengaged position, the locator spring S6 and sleeve 60 push the second arm 58 of the locator 46 to rotate the locator 46 clockwise (FIG. 3).

When the seat back is dumped forward, the control cable 40 is tensioned which pulls on the second end 36 of the cam 32 and rotates the cam 32 to the engaged position. In this position, the camming surface 38 engages the adjustment bar 28 which moves the locking plate 26 to the disengaged position. Hence, the upper track member 20 is released from the lower track member 18. A dump spring (not shown) is connected to the upper track member 20 to continuously bias the upper track member 20 toward the forward dump position. Hence, when the cam 32 is actuated and the locking mechanism 24 is released, the dump spring moves the seat assembly 10 into the forward dump position. As appreciated, other devices could also be utilized to assist in the sliding of the seat to the forward dump position.

The rotation of cam 32 will rotate locator 46 from the release position to the blocking position. The first arm 52 of the locator 46 will be rotated to engage with the stop 50. However, the bias of locator spring 56 will allow the locator 46 to rotate as it slides by the stop 50.

When a user desires to return the seat from the forward dump position to the normal seating position, the user moves the seat back 14 toward the rear seats. As appreciated, the locator 46 is in the blocking position as shown in FIG. 4. The aft movement will slide the upper track member 20 and the seat assembly 10 along the lower track member 18 until the first arm 52 of the locator 46 abuts the fixed stop 50 at the predetermined stop position. The user will not be able to slide the seat any further. The seat back 14 will then pivot from the forward dump to the operational position which releases the tension on the control cable 40. The cam return spring 44 then pulls the first end 34 of the cam 32 to rotate the cam 32 to the disengaged position which releases the locking mechanism 24 and relocks the track members 18, 20. Specifically, the cam 32 no longer engages the adjustment bar 28 which in turn no longer engages the locking plate 26. The rotation of the cam 32 also pushes on the locator spring 56 which rotates the first arm 52 of the locator 46 to the release position as discussed above and as shown in FIG. 3. The locator 46 is pivoted out of the way such that the front seat assembly 10 may now be freely adjusted as desired.

The position of the front seat immediately after returning of the front seat from the forward dumped position will be at the predetermined stop position where the locator 46 interferes with the fixed stop 50. This location is designed such that passengers and/or cargo in the rear seats will not be interfered by the rearward movement of the front seat and the driver or front passenger will have adequate room for entering the vehicle. As discussed above, the predetermined stop position is preferably midway along the seat track mechanism 16.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A seat track assembly (16) for use with an automotive seat assembly (10) comprising a seat cushion (12), a seat back (14) pivotally mounted to said seat cushion (12) and movable between an operation position and a forwardly dumped position, said seat track assembly (16) comprising:

a lower track member (18), an upper track member (20) mounted to said seat cushion (12) and movably supported by said lower track member (1 8) for fore and aft movement between forward and rearward positions, a locking mechanism (24) mounted between said upper (20) and lower (18) track members for selectively locking and unlocking said track members (18, 20) to selectively allow said fore and aft movement, a slide actuator (30) operatively connected to said seat back (14), and said locking mechanism (24) for effecting said unlocking of said track members (18, 20) in response to said seat back (14) moving to said forwardly dumped position, and a stop (50) fixed relative to said lower track member (18), said seat track assembly (16) characterized by a locator (46) mounted to said upper track member (20), said locator (46) movable to a blocking position in response to said seat back (14) moves to said forwardly dumped position, said locator (46) engaging said stop (50) when said upper track member (20) moves aft from said forward position toward said rearward position, said locator (46) remaining in said blocking position abutting said stop (50) until said locking mechanism (24) locks said upper tack member (20) to said lower track member (18) such that said locator (46) prevents further aft movement of said upper track member (20) beyond said stop (50) and locates said upper track member (20) at a predetermined stop position.

2. A seal track assembly as set forth in claim 1 wherein said stop (50) extends from said lower track member (18) to align with said locator (46).

3. A seat track assembly as set forth in claim 2 wherein said locator (46) is pivotally mounted to said upper track member (20) and includes an outwardly extending first arm (52) aligned with said stop (50).

4. A seat track assembly as set forth in claim 3 wherein said locator (46) further includes a tab (54) for limiting the movement of the locator (46) in the blocking position.

5. A seat track assembly as set forth in claim 1 wherein said slide actuator (30) is rotatably mounted to said upper track member (20).

6. A seat track assembly as set forth in claim 5 wherein said slide actuator (30) includes a cam (32) having first (34) and second (36) ends with said first end (34) engaging said locking mechanism (24) and said second end (36) interconnected to said locator (46).

7. A seat track assembly as set forth in claim 6 wherein said first end (34) of said cam (32) includes a camming surface for engaging said locking mechanism (24).

8. A seat track assembly as set forth in claim 7 further including a return spring (44) connected to said first end (34) of said cam (32) to continuously bias said cam (32) towards a release position disengaged from said locking mechanism (24).

9. A seat track assembly as set forth in claim 8 further including a control cable (40) connected between said second end (36) of said cam (32) and said seat back (14).

10. A seat track assembly as set forth in claim 9 wherein said locator (46) is connected to said second end (36) of said cam (32) by a push-pull connector biasing the locator (46) to permit fore movement of said upper track member (20) while said locator (46) is in said blocking position.

11. A seat track assembly as set forth in claim 10 wherein said push-pull connector comprises a locator spring (56) and a sleeve (60) disposed about said locator spring (56) continuously biasing said locator (46) toward said release position when said slide actuator (30) is in a disengaged position.

12. An automotive seat assembly (10) comprising:
a seat cushion (12),
a seat back (14) pivotally mounted to said seat cushion (12) and movable between an operation position and a forwardly dumped position,
a lower track member (18),
an upper track member (20) mounted to said seat cushion (12) and movably supported by said lower track member (18) for fore and aft movement between forward and rearward positions, said upper track member (20) biased to said forward position,
a locking mechanism (24) mounted between said upper (20) and lower (18) track members for selectively locking and unlocking said track members (18, 20) to selectively allow said fore and aft movement,
a slide actuator (30) operatively engaging said seat back (14), said slide actuator (30) engaging said locking mechanism (24) and effecting said unlocking of said track members (18, 20) in response to said seat back (14) moving said forwardly dumped position, and
a stop (50) fixed relative to said lower track member (18),
said assembly (10) characterized by a locator (46) mounted to said upper track member (20), said locator (46) movable to a blocking position in response to said seat back (14) moving to said forwardly dumped position, said locator (46) engaging said stop (50) when said upper track member (20) moves aft from said forward position toward said rearward position, said locator (46) remaining in said blocking position abutting said stop (50) until said locking mechanism (24) locks said upper track member (20) to said lower track member (18) such that said locator (46) prevents flyer aft movement of said upper track member (20) beyond said stop (50) and locates said upper track member (20) at a predetermined stop position.

13. An assembly as set forth in claim 12 wherein said stop (50) extends from said lower track member (18) to align with said locator (46).

14. An assembly as set forth in claim 13 wherein said locator (46) is pivotally mounted to said upper track member (20) and includes an outwardly extending first arm (52) aligned with said stop (50).

15. An assembly as set forth in claim 14 wherein said locator (46) further includes a tab (54) for limiting the movement of the locator (46) in the blocking position.

16. An assembly as set forth in claim 12 wherein said slide a for (30) is rotatably mounted to said upper track member (20).

17. An assembly as set forth in claim 16 wherein said slide actuator (30) includes a cam (32) having first (34) and second (36) ends with said first end (34) engaging said locking mechanism (24) and said second end (36) interconnected to said locator (46).

18. An assembly as set forth in claim 17 wherein said first end (34) of said cam (32) includes a camming surface for engaging said locking mechanism (24).

19. An assembly as set forth in claim 18 further including a return spring (44) connected to said first cud of said can (32) to continuously bias said cam (32) towards a release position disengaged from said locking mechanism (24).

20. An assembly as set forth in claim 19 further including a control cable (40) connected between said second end (36) of said cam (32) and said seat back (14).

21. An assembly as set forth in claim 20 wherein said locator (46) is connected to said second end (36) of said cam (32) by a push-pull connector biasing the locator (46) to permit fore movement of said upper track member (20) while said locator (46) is in said blocking position.

22. An assembly as set forth in claim 21 wherein said push-pull connector comprises a locator spring (56) and a sleeve (60) disposed about said locator spring (56) continuously biasing said locator (46) toward said release position when said slide actuator (30) is in a disengaged position.

* * * * *

UNITED STATES PATENT AND TRADEMARK OFFICE
CERTIFICATE OF CORRECTION

PATENT NO. : 6,619,741 B1
DATED : September 16, 2003
INVENTOR(S) : Tame

It is certified that error appears in the above-identified patent and that said Letters Patent is hereby corrected as shown below:

<u>Title page,</u>
Item [57], ABSTRACT,
Line 12, delete "30".
Line 13, delete "46".

<u>Column 1,</u>
Line 15, delete "arm" and insert -- are -- therefor.
Line 30, delete "trace" and insert -- track -- therefor.
Line 36, add a -- . -- after "position" therefor.
Line 54, delete "&" and insert -- S -- therefor.
Line 59, delete "tacks" and insert -- tracks -- therefor.

<u>Column 2,</u>
Line 51, insert -- and -- between "forward" and "rearward".
Line 53, delete "enraged" and insert -- engaged -- therefor.
Line 55, delete "tho" and insert -- the -- therefor.

<u>Column 3,</u>
Line 13, delete "sider" and insert -- sidered in -- therefor.
Line 35, delete "14" and insert -- 18 -- therefor.
Line 37, delete "at" and insert -- art -- therefor.
Line 50, delete "all" and insert -- art -- therefor.
Line 52, delete "sot" and insert -- set -- therefor.

<u>Column 4,</u>
Line 15, delete "tack" and insert -- track -- therefor.
Line 44, delete "." after "engaging".
Line 53, delete "Is In" and insert -- is in -- therefor.

<u>Column 5,</u>
Line 48, delete "tape" and insert -- type -- therefor.
Line 54, delete "S6" and insert -- 56 -- therefor.

<u>Column 6,</u>
Line 56, delete space between "1" and "8" and insert -- 18 -- therefor.

UNITED STATES PATENT AND TRADEMARK OFFICE
CERTIFICATE OF CORRECTION

PATENT NO. : 6,619,741 B1
DATED : September 16, 2003
INVENTOR(S) : Tame

It is certified that error appears in the above-identified patent and that said Letters Patent is hereby corrected as shown below:

Column 7,
Line 4, delete "moves" and insert -- moving -- therefor.
Line 15, delete "seal" and insert -- seat -- therefor.

Column 8,
Line 10, add -- to -- after "moving" therefor.
Line 23, delete "flyer" and insert -- further -- therefor.
Line 37, delete "a for" and insert -- actuator -- therefor.
Line 48, delete "cud" and insert -- end -- therefor.
Line 48, delete "can" and insert -- cam -- therefor.

Signed and Sealed this

Twenty-eighth Day of October, 2003

JAMES E. ROGAN
*Director of the United States Patent and Trademark Office*